MAGNETIC CORE PHASE COMPARISON CIRCUIT
Filed Jan. 22, 1968 8 Sheets-Sheet 1

Aug. 11, 1970 W. D. HUMPAGE ET AL 3,524,200

MAGNETIC CORE PHASE COMPARISON CIRCUIT

Filed Jan. 22, 1968 8 Sheets-Sheet 7

United States Patent Office 3,524,200
Patented Aug. 11, 1970

3,524,200
MAGNETIC CORE PHASE COMPARISON CIRCUIT
William Derek Humpage and Selliah Manickavasagar, Manchester, England, assignors to The English Electric Company Limited, London, England, a British company
Filed Jan. 22, 1968, Ser. No. 699,735
Claims priority, application Great Britain, Jan. 20, 1967, 3,189/67
Int. Cl. H04q 9/08
U.S. Cl. 340—170 13 Claims

ABSTRACT OF THE DISCLOSURE

This invention relates to electrical protective relays and more particularly concerns a comparator for comparing the phase relationship between two input signals and operative to develop an output when their phase displacement lies within predetermined limits. Basically, the comparator includes a coincidence detector for producing pulses having a duration dependent on the periods of coincidence between the input signals and a magnetic circuit comprising a pulsewidth detector and integrator. This latter circuit includes at least one core magnetised by the aforesaid pulses to a degree dependent on their duration and which is successively reset by a predetermined amount, this circuit being operative to develop an output indicative of the phase displacement referred to only in response to the pulses being of such duration as to saturate the core.

This invention relates to electrical relays, and particularly, but not exclusively, relates to electrical distance relays for protecting power lines.

From one aspect the present invention consists in an electrical relay comprising a comparator for comparing the phase relationship between two alternating input signals applied thereto and operative to develop an output in dependence thereon, the comparator including a coincidence detector for developing pulses each having a duration determined by the period for which the senses of the corresponding signal excursions are simultaneously in a predetermined relationship with one another, and a magnetic circuit including a core magnetised by said pulses to a degree dependent on their duration, and successively reset by a predetermined amount, the circuit being operative to develop an output only in response to the pulses being of such duration as to saturate the core whereby said output is indicative of the phase displacement between the signals lying within predetermined limits.

The coincidence detector preferably develops pulses during the period for which the senses of the corresponding signal excursions are simultaneously both positive and for the period for which they are both negative, and the input signals may conveniently be converted into amplitude-limited rectangular waves for application to this detector. In addition, the detector may develop two sets of these pulses, corresponding to the sum of, and the difference between, the amplitude-limited waves and under these conditions the magnetic circuit may include two cores, as described, separately responsive to these sets of pulses.

Each core may be magnetised by its input pulses of one sense and reset a predetermined amount by the succeeding input pulse of the opposite sense, the arrangement being such that the core just saturates in one sense or another when the input pulse has a duration $t$ corresponding to a phase displacement between the signals lying at either one of the said predetermined limits. Thus, output pulses are only produced when the phase displacement of the signals lies within these limits, and the duration of these pulses corresponds to the difference between the actual phase displacement and that displacement existing at the said limits. An integrator circuit may be provided for summing these output pulses and effecting a protective function upon the sum attaining a preset level so that the speed of response of the relay is directly related to the magnitude of the departure of the signals from their limiting phase relationship.

Alternatively, each core may be saturable at a higher level than that referred to, and may be magnetised by its input pulse of one sense and reset by a biassing circuit, the predetermined amount by which the core is reset being insufficient to wholly reset this core with input pulses having a duration exceeding $t$. Thus, the core will progressively rise to its saturation level with succeeding input pulses which exceed this latter duration, thereby performing the integration function mentioned above without the need for a separate circuit.

In a further modification, the function of the biassing circuit may be performed by deriving reset pulses from the input waveform and applying these pulses to the cores.

The coincidence detector may conveniently comprise an arrangement of magnetic cores having windings connected in push-pull or a system of diodes may alternatively be employed.

Further, one particularly useful arrangement is to employ two full-wave rectifiers for respectively receiving the two sets of pulses corresponding to the sum of, and the difference between, the amplitude-limited input signals. In this instance only one core need be employed in the magnetic circuit performing the dual function of pulse-width detection and integration since the direction of these rectifiers, relative to the core windings, are such that both the positive and negative pulses magnetise the core in the same sense.

Yet another embodiment utilises a rectifier bridge phase comparator as the detector since this develops unidirectional pulses for both positive and negative periods of coincidence and again only one core need be employed in the aforesaid magnetic circuit.

The whole comparator may thus include only diodes, resistors and magnetic cores with appropriate windings, and no power supply is needed although an active stage of amplification may be included if desired; accordingly, a remarkably simple, efficient and reliable device is provided with a minimum number of components.

A relay according to this invention may conveniently be employed as a protective relay, e.g., a distance relay, the signals $S_1$ and $S_2$ being representative of conditions in a section of power line being protected, and the comparator output may be employed for firing a thyristor or the like in order to trip a protective circuit-breaker. In this connection, the application of this relay to the field of distance protection will be evident from the following detailed description of preferred embodiments of the invention, with reference to the accompanying drawings, in which:

FIG. 1 shows a block diagram of the phase comparator in the relay according to this invention;

FIGS. 2(*a*) to 2(*c*) show waveforms illustrating the principles on which the invention is based;

FIG. 3 shows one form of phase comparator;

FIGS. 4(*a*) to 4(*f*) show waveforms appearing at various positions in the comparator according to FIG. 3;

Figure 8:
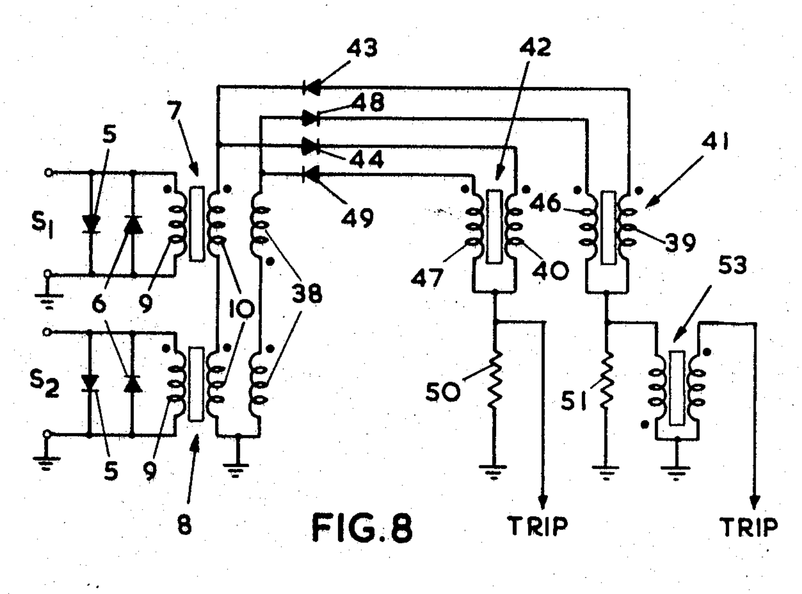
FIG. 8 shows another form of phase comparator which operates, in principle, similarly to that shown in FIG. 6.
Figure 9:
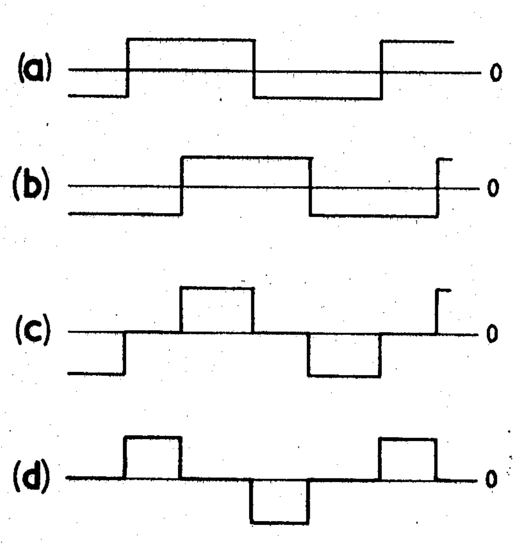
Figure 10:
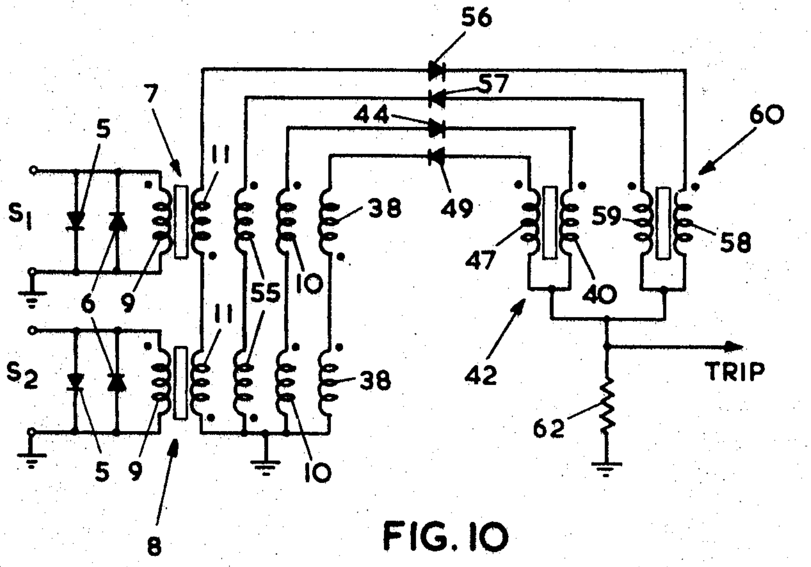
Figure 16:
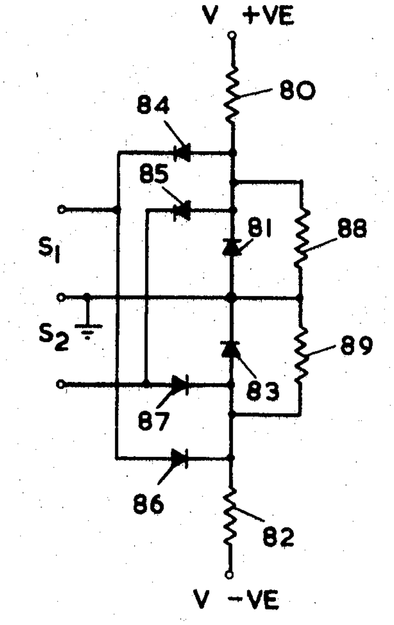
Figure 11:
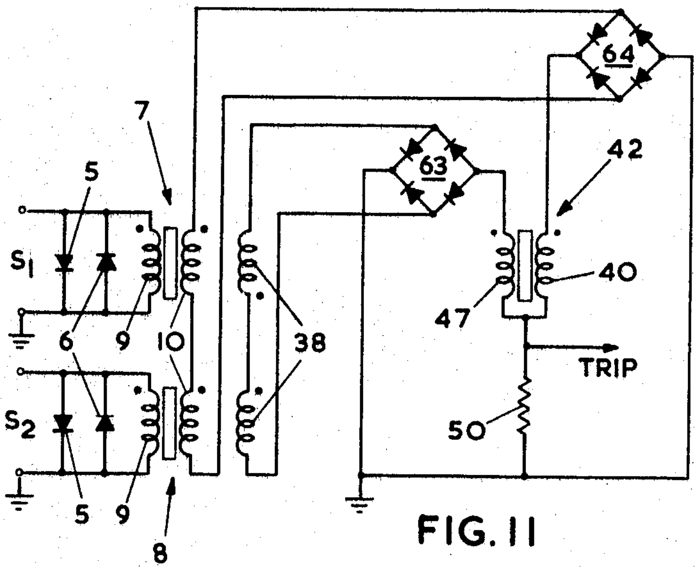
Figure 12:
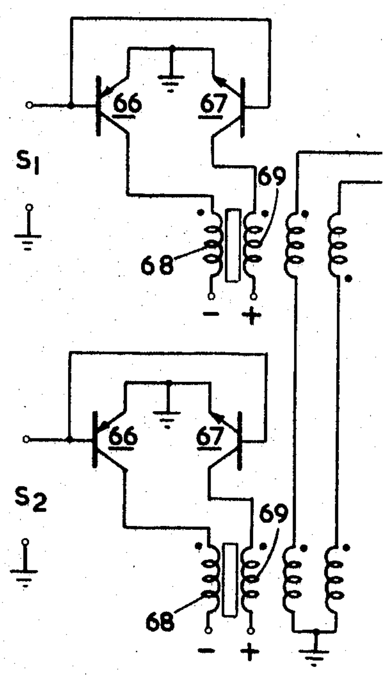
Figure 13:
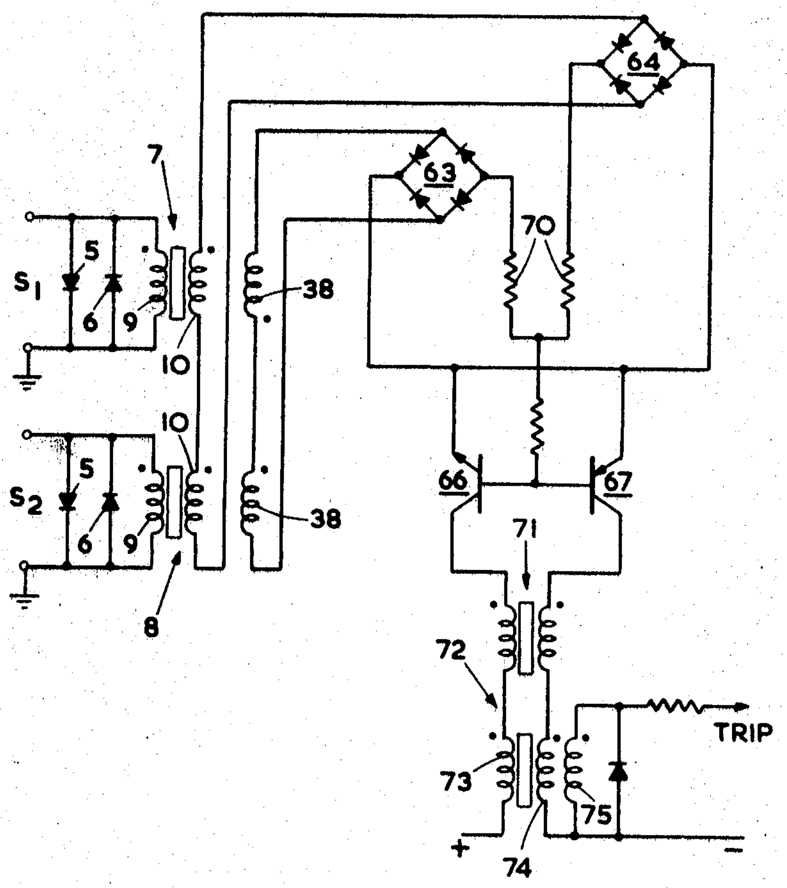
Figure 14:
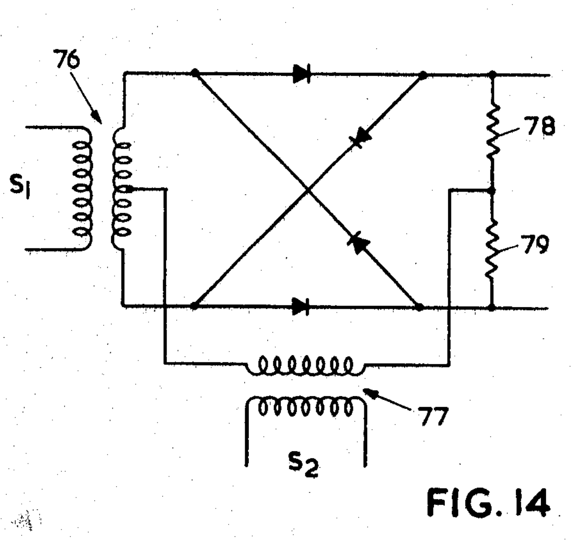
Figure 15:
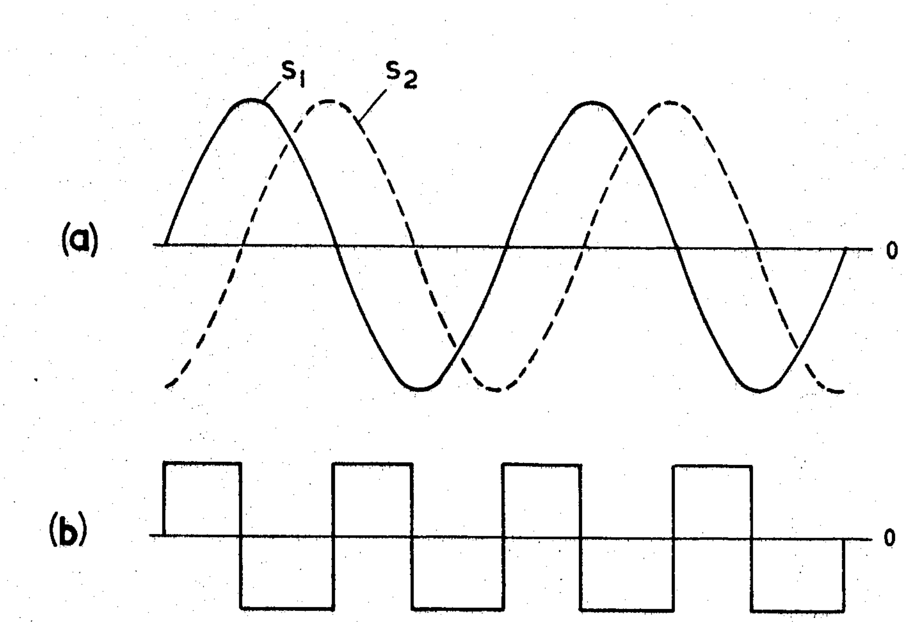

FIGS. 9(*a*) to 9(*d*) show waveforms appearing at various positions in the comparator shown in FIG. 8;

FIG. 10 shows another form of comparator which obviates the need for the invertor transformer employed in FIG. 8;

FIG. 11 shows another form of comparator by which only one core is needed for the pulse-width detection and integration;

FIG. 12 shows an "active" input stage to the coincidence detector;

FIG. 13 shows a modification of the FIG. 11 comparator incorporating an "active" amplification and switching stage;

FIG. 14 shows a rectifier-bridge phase comparator which may alternatively be employed for detecting coincidence;

FIGS. 15(*a*) and (*b*) show input waveforms to this bridge and output waveforms derived therefrom; and FIG. 16 shows a diode detector which may also be employed for detecting coincidence of the input signals.

Figure 1:
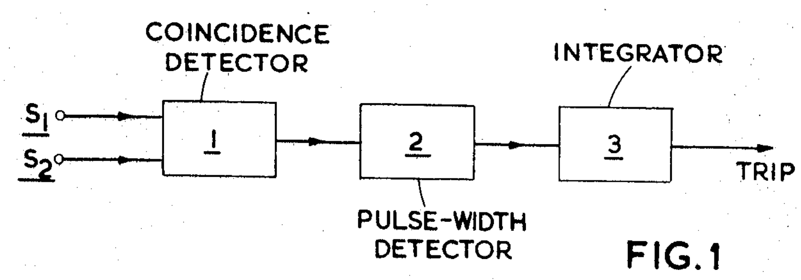

Referring now to the drawings, FIG. 1 shows the basic form of the comparator employed in a distance relay, including a coincidence detector 1 receiving two input signals $S_1$ and $S_2$, a pulse width detector 2 for developing an output for the period during which the input signals $S_1$ and $S_2$ are coincident in excess of a predetermined duration, and an integrator for integrating this output signal whereby to initiate protective action by the relay with a delay inversely related to the period of this signal.

Figure 2:
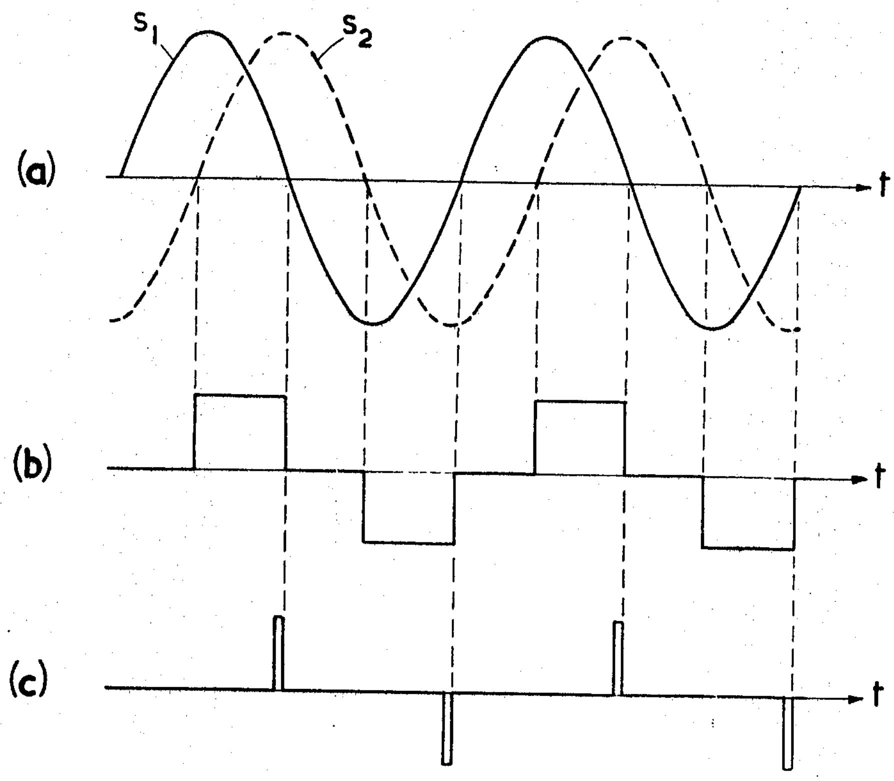

Referring now to FIGS. 2(*a*) to 2(*c*) the principle of operation of the comparator is more clearly illustrated.

In FIG. 2(*a*) two sinusoidal signals $S_1$ and $S_2$ representative of conditions existing in a protected section of power line are phase displaced from one another. These signals may be related to the voltage $V_L$ and the current $I_L$ in the line by the relationship $$S_1 = K_{1\underline{\alpha 1}} V_L + Z_{R1} I_L \underline{\theta_1 - \phi_L}$$

$$S_2 = K_{2\underline{\alpha 1}} V_L + Z_{R2} I_L \underline{\theta_1 - \theta_L}$$

where $K\alpha$ is a voltage coefficient accounting for voltage transformation from the primary (line) system and $Z_R\theta$ is a transfer impedance accounting for current transformation from the primary system.

In this example, signal $S_1$ leads $S_2$ by 80°, and it will be assumed that the angular limits for initiating protective action by the relay, that is, the development of the trip signal for a circuit-breaker, are when the phase displacement between signals $S_1$ and $S_2$ lies between ±90°. Under these conditions then, the angles over which the two signals must be coincident, to produce a tripping signal, i.e., both of positive polarity or both of negative polarity, are between 90° and 180°.

In FIG. 2(*b*) there is shown the signals developed by the coincidence detector 1 responsive to the two input signals $S_1$ and $S_2$ from which it can be seen that coincidence exists over 100° of both the positive and negative half cycles. In terms of a 50 c./s. power frequency, the period of this coincidence is 50/9 milliseconds, and since this period exceeds the 5 m.sec. limiting period (90°), then the relay should trip.

The discrimination between trip and no-trip conditions is effected by the pulse-width detector 2 and in FIG. 2(*c*) it can be seen that an output is only produced from this unit for the duration for which the two signals are coincident in excess of this limiting period, i.e. (50/9—5) m.secs.

The integrator 3 then summates the output pulses developed from the detector, both the positive and negative pulses being cumulatively added, and produces a trip signal when this summated output has attained a predetermined magnitude.

Clearly, when the relay is reaching to internal faults adjacent the boundary of its protection characteristic, the duration of the output pulses from the detector will be very short and accordingly the production of a trip signal will be delayed whereas, for closeup faults, the duration of the output pulses will be much longer and the trip signal will be produced almost instantaneously.

Figure 3:
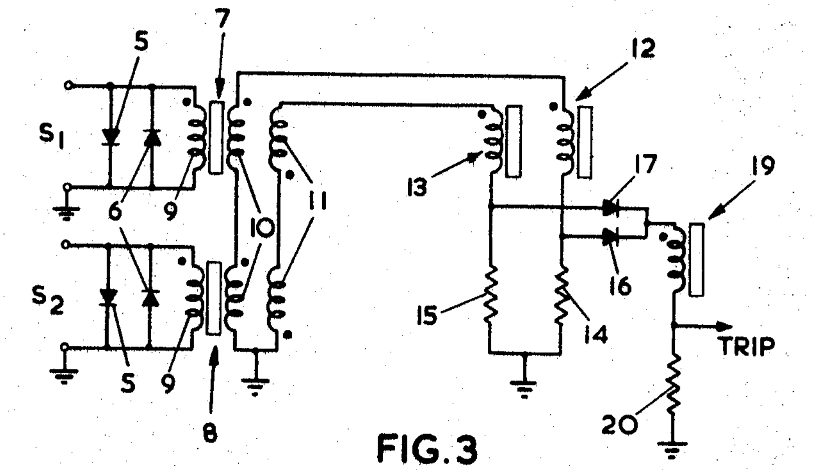

Referring now to FIG. 3, there is shown one form of comparator according to this invention. In particular, the sinusodial imput signals $S_1$ and $S_2$ are amplitude limited by reverse-connected diodes 5, 6 and are applied as substantially rectangular waveform signals to ring-type "square-loop" cores 7, 8, respectively. Each of these cores has an input winding 9, and two output windings 10, 11 wound in opposite senses, the output windings 10 of both cores being connected together in series and the output windings 11 also being connected together. These two cores 7 and 8 together form a push-pull coincidence detector and their outputs are fed to the pulse width detector constituted by two signal windings cores 12, 13 which receive the outputs from the windings 10, 11, respectively, and have load resistors 14, 15. Finally, any output developed across these resistors is applied through like-poled diodes 16, 17 to the integrator comprising a further single-winding core 19 and a load resistor 20 across which the output signal is taken.

Figure 4:
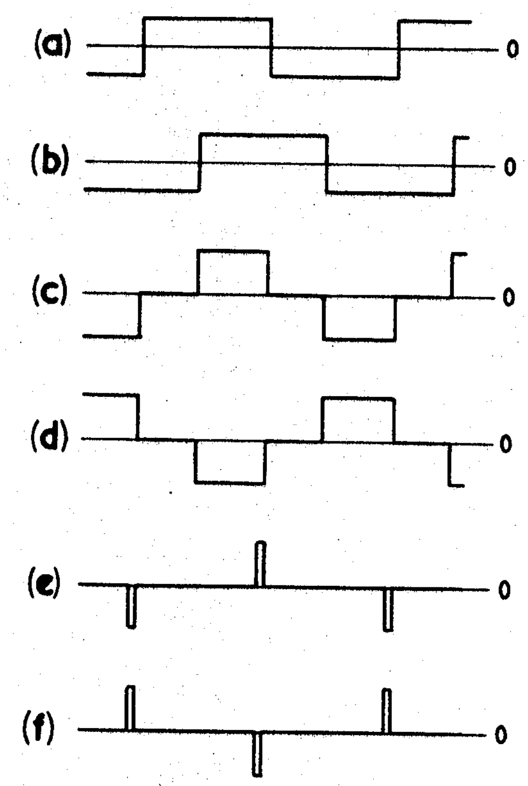

In operation, the diodes 5, 6 limit the input signal $S_1$ in the manner shown in FIG. 4(*a*) and limit the input signal $S_2$ in the manner shown in FIG. 4(*b*). The windings 10 are connected to add together these two signals and produce the output shown in FIG. 4(*c*) whilst the windings 11 are so connected as to "invert" these signals so that the resultant output is as shown in FIG. 4(*d*). These positive- and negative-going pulses are then applied to the two cores 12 and 13 and successively set and reset these cores.

In this example, the relationship between the signals $S_1$ and $S_2$ has been maintained the same as that described with reference to FIG. 2 so that the periods of the positive- and negative-going pulses exceed the 5 m.sec. limit, and as will be described in detail below, outputs are developed across the resistors 14 and 15 in the form of positive and negatice pulses, c.f., FIGS. 4(*e*) and 4(*f*). The diodes 16, 17 permit only the positive pulses to be applied to the winding on the core 19 and since the pulses are unidirectional the core is driven into saturation in a period inversely proportional to the volt-time area of each pulse; when the core saturates, the whole of the applied input voltage is dropped across the resistor 20 in a similar manner to that described below with reference to the pulse-width detector and a tripping output signal is thereby produced. Subsequently, the core is reset.

Figure 5:
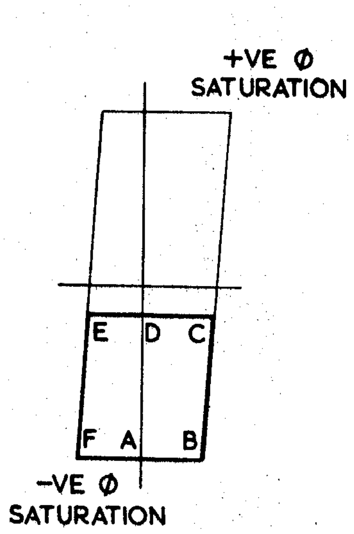
FIG. 5 shows a hysteresis loop of one of the cores employed in the magnetic circuit performing "pulse-width detection" in this comparator.

Considering now the operation of the pulse-width detector, reference will be made to FIG. 5 which shows the hysteresis loop of the magnetic material of, say, the core 12. Now, the pulses applied to this core have a predetermined amplitude, and accordingly, the volttime area of these pulses for any particular width can readily be determined. Similarly, the area of the hysteresis loop of the core can be determined, and in this instance the arrangement is such that when the input waveform has a pulse width of 5 m.secs. there will be a flux transition which just extends from one saturated value to another.

In operation, the core is initially biassed to its stable state "A" and with the application of a positive pulse from the windings 10 having a width of, for example, 2 m.secs. (representing a phase displacement of 144° between $S_1$ and $S_2$) the flux will traverse the path ABCD. The subsequent negative pulse from these windings of the same width causes the flux to traverse the path DEFA, thus just "resetting" the core. Under this condition there is substantially no current flow through the load resistor 14 since the voltage induced in the winding almost balances the applied voltage waveform and this will be the case for all flux transitions within the saturation limits of the loop, i.e., all pulse widths up to 5 m.secs. When the pulse width exceeds this latter period however, the core saturates and, with a positive pulse, the working point will be limited at $\phi$ sat. +ve (FIG. 5) whereupon the rate of change of flux is arrested, the induced voltage immediately drops to zero and the whole input voltage is then dropped across resister 14, producing a positive pulse having a duration equal to the period for which the applied pulse exceeded 5 m.secs. Thus, with a positive input pulse having the width shown in FIG. 4(*c*) an output pulse having the width shown in FIG. 4(*e*) will be developed across resistor 14. Subsequently, the following negative pulse will drive the core to $\phi$ sat. −ve whereupon a negative pulse of the same duration as the positive pulse will be developed across resistor 14. Thus, in all cases, the core is returned to its initial condition following positive-negative pulse transitions and an output is produced only when these pulses exceed 5 m.secs. in width. The same considerations also apply to the core 13 and its load resistor 15.

For the correct performance of this function, it will be appreciated that the positive and negative periods of coincidence must be the same otherwise the core may be incrementally magnetised towards one of its saturated values by successive pulses applied to it. With a symmetrical waveform, the periods of coincidence must be the same but in order to compensate for any asymmetry which may give rise to the effect mentioned the outputs from the windings 10 and 11 may be combined in a push-pull driver stage before being applied to the pulse-width detector.

This basic circuit shown in FIG. 3 may however conveniently be modified to effect the same mode of operation whilst incorporating the integrator in the pulse-width detector and avoiding the need for the special driver stage.

Figure 6:
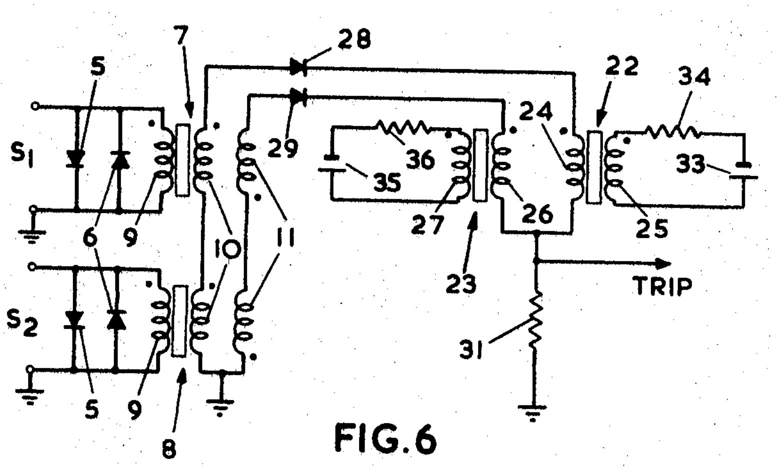
FIG. 6 shows another form of phase comparator in which pulse-width detection and integration is performed in one unit.

Referring now to FIG. 6 there is shown such a circuit, the components labelled 5 to 11 being the same as the corresponding components shown in FIG. 3. In this embodiment, the "integrating pulse-width detector" comprises two cores 22, 23 having two windings 24, 25 and 26, 27, respectively. Windings 24 and 26 receive positive input pulses only, through diodes 28, 29, and share a common load resistor 31 across which a positive tripping output may be developed. The winding 25 has connected across it a D.C. reset circuit comprising a battery 33 and a limiting resistor 34 and the winding 27 has connected across it a similar battery 35 and a resistor 36.

In this embodiment, the D.C. reset circuit for each core is chosen to reset the core fully when the input pulse applied to it has a width not greater than 5 m.secs. In turn, the area of the hysteresis loop is chosen so that the width of the pulse required to cause a complete flux transition from one saturated value to another is, for example, 7.5 m.secs. (representing a phase displacement of 45° between $S_1$ and $S_2$) the difference $(7.5-5)=2.5$ m.secs. conveniently being equivalent to the pulse width required to saturate in one flux transition the integrator core 19 discussed wtih reference to FIG. 3.

Figure 7:
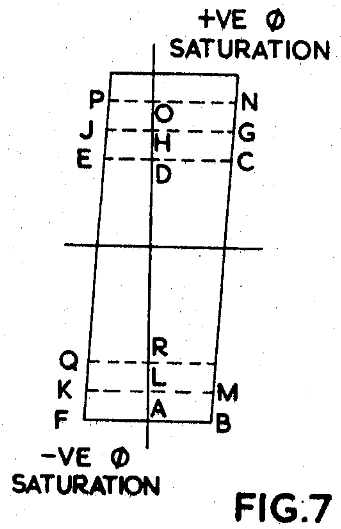
FIG. 7 shows a hysteresis loop of one of the cores employed in this latter unit under conditions giving rise to saturation.

The operation of this integrating pulse-width detector can best be understood by referring to FIG. 7 which shows the hysteresis loop of, say, the core 22. With a positive input pulse of 5 m.secs. duration the flux traverses the path ABCD, the magnitude of this pulse overcoming the "restoring" action of the D.C. bias from the battery 33, and following the cessation of this pulse the remaining period (15 m.secs.) is sufficient for the bias battery to reverse the flux along the path DEFA and thus fully reset the core. However, with a pulse of, say, 5.5 m.secs. duration the flux may traverse the path ABGH whereupon, at the cessation of this pulse, the reset circuit is operative during the remaining 14.5 m.secs. only partially to reset the core so that the flux returns along the path HJKL. Thus, the subsequent positive pulse causes the flux to traverse the path LMNO, which is then reset along OPQR and the next pulse drives the core into saturation (positive) whereupon an output is developed across the resistor 31.

The same considerations apply to the core 23, the positive input pulses to this core being phase displaced by 180° from those applied to the core 22.

This integrating pulse-width detector may be modified so as to incorporate "automatic bias" for the resetting circuit, thereby dispensing with the batteries, and a typical circuit is shown in FIG. 8.

Referring now to this figure, the connections of the components labelled 5 to 10 are the same as those shown in FIGS. 3 and 6 but, contrary to the windings 11 shown in these figures, the third set of windings 38 associated with the cores 7 and 8 are wound in opposite senses. The output from the windings 10 is applied to drive windings 39, 40 on two cores 41, 42 through two oppositely-poled diodes 43, 44, respectively, and the output from the windings 38 is applied in a similar manner to reset windings 46, 47 on these cores through oppostiely-poled diodes 48, 49, respectively. A load resistor 50 is connected to the windings 40 and 47 associated with the core 42 and a load resistor 51 is connected to the windings 39, 46 associated with the core 41, the output across this latter resistor being phase inverted by a 1:1 transformer 53 in order to convert this output into the same polarity (positive) as that developed across resistor 50.

In describing the operation of this circuit, reference will be made to the waveforms shown in FIG. 9(*a*) to (*d*). FIG. 9(*a*) shows the amplitude limited input signal $S_1$ and FIG. 9(*b*) shows the amplitude limited signal $S_2$, the phase relationship between these signals being the same as that shown in FIGS. 4(*a*) and (*b*). FIG. 9(*c*) shows the output across the windings 10, that is, the summation of these waveforms and FIG. 9(*d*) shows the output across windings 38, that is, the difference of these waveforms.

The positive pulse (FIG. 9(*c*)) of width 50/9 m.secs. is applied through diode 44 to the drive winding 40 and the negative pulse of the same width is applied through diode 43 to drive winding 39. Similarly, the negative pulse (FIG. 9(*d*)) of width 40/9 m.secs. is applied through diode 49 to the reset winding 47 and the positive pulse of the same width is applied through diode 48 to the reset winding 46. Thus, the volt-time area of the drive pulses exceeds the volt-time area of the reset pulses and the cores 41 and 42 are incrementally driven to saturation in a similar manner to that described with reference to FIG. 7 in dependence on the magnitude of the difference between tthe drive and reset pulses. More particularly, the core 42 is driven into positive saturation under the conditions given, so that a positive output is developed across resistor 50 and the core 41 is driven into negative saturation so that a negative output is developed across resistor 51, this output being inverted by the transformer 53.

The need for this transformer can be obviated by employing the modified circuit shown in FIG. 10 in which only positive drive and negative reset pulses are now applied from the windings 10, 38, respectively, to the core 42, and in which the windings 11 and a further winding 55 are connected through diodes 56, 57 to the drive windings 58 and the reset winding 59, respectively, of another core 60. A common load resistor 62 is connected to the windings on these two cores 42 and 60.

The pulses developed across the windings 10 and 38 are as shown in FIGS. 9(*c*) and 9(*d*), the pulses across the winding 11 are the inverse of FIG. 9(*c*), i.e., as shown in FIG. 4(*d*) and the pulses across the winding 55 are the inverse of FIG. 9(*d*). Thus, the operation with respect to the core 42 is the same as that discussed above with reference to FIG. 8, this core being driven into positive saturation, but in this instance the core 60 is also driven into positive saturation under the conditions specified since the positive drive pulses of width (50/9—5)

m.secs. (FIG. 4(*d*)) have a larger volt-time area than the negative reset pulses of width 40/9 m.secs.

Accordingly, the trip pulse developed across the output resistor is always of positive polarity.

Another modification is shown in FIG. 11 in which the coincidence detector circuitry is the same as that shown in FIG. 8 but in which the pulses developed across the windings 10 and 38 are now applied across full-wave bridge rectifiers 63, 64, respectively, to the integrating pulse-width detector. By employing these rectifiers 63, 64 both the positive and negative pulses (FIG. 9(*c*)) energise the winding 40 in one sense tending to drive the core 42 into saturation, and both the positive and negative pulses (FIG. 9(*d*)) energise the winding 47 in a sense tending to reset this core. Thus, only one core is needed in the integrating pulse-width detector, a positive trip pulse being obtained across the resistor 50 with the same response time as that obtained in the previous embodiments.

It will be evident that in all the circuits described above no "active" stage of amplification has been employed and in practice it may be desirable to include such a stage in order to increase the definition of the waveform and the sensitivity of the circuit. This may conveniently take the form of a push-pull transistor amplifier interposed between the coincidence detector and the integrating pulse-width detector, the transformer coupling in this stage being either saturable, in which case a D.C. reset circuit for each half wave may be employed in a similar manner to FIG. 6, or non-saturable.

Alternatively, transistorised input stages may be employed to perform the dual function of amplifying the input signals $S_1$, $S_2$ and converting them into rectangular waveform signals. Such input stages are shown in FIG. 12 and each comprises two complementary transistors 66, 67 connected across a bipolar supply source, the transistors having load windings 68, 69, respectively. These two windings are wound on cores 7, 8 included in the coincidence detector stage as in the previous embodiments.

In another embodiment shown in FIG. 13, an amplification and switching stage is introduced into the integrating pulse-width detector, this circuit being a modification of that shown in FIG. 11. In this instance, the complementary transistors 66, 67 are controlled in dependence on the outputs from the two full-wave bridge rectifiers 63, 64, their emitter electrodes being commoned, and their base electrodes being connected to a common resistor and thence separately connected to the bridge rectifiers 63, 64 via equal value resistors 70. Two cores 71, 72 are provided in the collector circuit of the transistors, the two windings on core 71 being respectively connected in series with windings 73, 74 wound on the core 72 and this core possessing an output winding 75 from which a trip signal is derived. In the operation of this circuit, if the drive pulses from the bridge rectifier 64 exceed the reset pulses there is an out-of-balance signal produced at the junction between the resistors 70 and the transistors 66, 67 are switched-on and switched-off in dependence on the sign of this signal. Under these conditions the core 71 is driven towards saturation by conduction of transistor 67 but until the onset of saturation the resultant current in the windings 73, 74 is insufficient to magnetise the core 72 so that there is no output across winding 75. Upon saturation of the core 71, however, conduction of transistor 67 causes an output of the appropriate polarity for a tripping signal (positive) to be developed across the output winding 75. Conversely, if the reset pulses exceed the drive pulses the core 71 is again driven towards saturation but in this case upon the onset of saturation the conduction of transistor 66 causes a negative output to be developed across the winding 75 which is ineffective for tripping.

Furthermore, it is to be understood that although five windings have been shown as being wound on each of the cores 7 and 8 of the coincidence detector in the FIG. 10 embodiment it may in practice be more convenient to use more than one core for accommodating these windings. However, the need for multi-winding cores in the input stage may be avoided altogether by employing a conventional rectifier bridge phase comparator as the coincidence detector.

Such a phase comparator is illustrated in FIG. 14, the input signals $S_1$ and $S_2$ being applied to input transformers 76, 77, respectively, and the rectified output being developed across equal value resistors 78, 79. In FIG. 15(*a*) the two signals $S_1$ and $S_2$ are shown in the same phase relationship as that described with reference to the preceding figures, and when these signals are opposite in polarity a positive output is produced whilst a negative output is produced when these signals have the same polarity. More particularly, when the signals are opposite in polarity the output voltage is $I(S_2) \cdot R$ when $S_1$ exceeds $S_2$ in magnitude and $I(S_1) \cdot R$ when $S_2$ exceeds $S_1$ where $R = R(78) + R(79)$, and the conditions are just the same for the case in which the signals are of the same polarity. The output across resistors 78 and 79 is amplified and limited, the resulting waveform being as shown in FIG. 15(*b*).

The "input" pulses are now unidirectional for coincidence in both the positive and negative senses and accordingly these pulses may be applied directly to only a single core, as in the FIG. 11 embodiment, for effecting integration and pulse-width detection, the signal relationships shown in FIGS. 15(*a*) and (*b*) giving rise to a tripping output in the same manner as that described with reference to FIGS. 6 to 10 since the period of the "drive" pulse exceeds that of the "reset" pulse.

Another form of coincidence detector which avoids the need for cores is a diode detector and one form of such a circuit is shown in FIG. 16.

More particularly, FIG. 16 shows a diode detector comprising like sources of supply ($V+ve$ and $V-ve$) connected to a common point (earth) through a series-connected resistor 80 and diode 81, and resistor 82 and diode 83, respectively. Signals $S_1$ and $S_2$ are applied across the diode 81 through like-poled diodes 84, 85 and are applied across diodes 83 through like-poled diodes 86, 87. Any positive output is developed in a load resistor 88 connected across the diode 81 and any negative output is developed in a load resistor 89 connected across the diode 83.

In operation, with one of the signals $S_1$ and $S_2$ negative and the other positive, the potential at the junction of resistors 80 and 88 assumes the negative value, diode 81 conducts and the current through its parallel resistor 88 is substantially zero. In addition, the potential at the junction of resistors 82 and 89 assumes the positive value, diode 83 conducts and the current through its parallel resistor 89 is substantially zero.

With both signals $S_1$ and $S_2$ positive, the current through resistor 89 remains the same, but since diodes 84 and 85 are now reverse biassed, diode 81 ceases conduction and the current through resistor 88 rises to a value determined by the supply voltage and the values of these resistors 80 and 88, this high current value being maintained for the period for which the signals $S_1$ and $S_2$ are both positive, i.e., the period of coincidence. On the other hand, with these two signals both negative, the current through resistor 88 will be substantially zero but since diodes 86 and 87 are now reverse biassed the current through resistor 89 will rise for the period of "negative" coincidence between these signals. Thus, the output pulses representative of positive and negative coincidence may be employed to activate the pulsewidth detector in the same manner described above with reference to the preceding figures.

We claim:

1. An electrical relay comprising a comparator for comparing the phase relationship between two alternating input signals applied thereto and operative to develop an output in dependence thereon, the comparator including a signal-limiting means for converting said alternating input signals into amplitude-limited rectangular waves, a coincidence detector for receiving said waves and developing pulses each having a duration determined by the period for which the senses of the corresponding signal excursions are simultaneously in a predetermined relationship with one another, and a magnetic circuit including a core magnetised by said pulses to a degree dependent on their duration, and reset means for successively resetting the core by a predetermined amount, the circuit being operative to develop an output only in response to the pulses being of such duration as to saturate the core whereby said output is indicative of the phase displacement between the signals lying within predetermined limits.

2. A relay according to claim 1, wherein the detector is operative to develop at least two sets of said pulses, dependent on the sum of and the difference between the input signals.

3. A relay according to claim 2, wherein the detector comprises a magnetic core, said core having two primary windings for receiving the two input signals and a plurality of sets of secondary windings so wound relatively to one another and to the primaries as to develop the said sets of pulses in the desired polarities.

4. A relay according to claim 3, comprising a first full-wave rectifier for unidirectionalising one set of said pulses from the detector and applying them to magnetise the said core in the magnetic circuit and a second full-wave rectifier for unidirectionalising the other set of pulses and applying them to reset or demagnetise the core by said predetermined amount, the core being driven towards saturation to develop said output only when the duration of the pulses in the said one set exceeds the duration of the pulses in the other.

5. A relay according to claim 4, comprising an amplifier stage including a complementary pair of transistors connected to receive an unbalance signal from said first and second full-wave rectifiers and selectively operable to conduct in dependence on said signal, the signal being indicative of the said phase displacement lying inside or outside the predetermined limits, said core in the magnetic circuit having two windings respectively connected in the output circuits of the pair of transistors, and a load circuit the two windings together being connected to said load circuit whereby to develop an output only upon the said core saturating in response to conduction of one only of said pair of transistors.

6. A relay according to claim 3, wherein the magnetic circuit comprises two cores having single windings for respectively receiving the two sets of pulses from the detector, each core being driven into saturation when the pulses have a duration corresponding to a phase displacement equal to or exceeding that defined by either one of the said predetermined limits, the duration of the output pulses produced thereby corresponding to the difference between the actual phase displacement of the signals and that displacement defined by these limits.

7. A relay according to claim 6, comprising an integrator for summing the output pulses and effecting a protective function only in response to the sum attaining a preset level.

8. A relay according to claim 3, comprising unidirectionally conducting devices connected to said sets of secondary windings, and wherein said magnetic circuit comprises biasing means and two cores having input windings for respectively receiving the two sets of pulses from the detector through the unidirectionally conducting devices, wherein the cores are magnetised by said input pulses and reset by said predetermined amount by the biasing means, the cores being incrementally driven into saturation against the restoring action of the biassing means to develop said output when the pulses consistently have a duration corresponding to a phase displacement equal to or exceeding that defined by either one of said limits.

9. A relay according to claim 8, wherein the biassing means comprises an auxiliary winding on each core energised from a D.C. source.

10. A relay according to claim 8, comprising further unidirectionally conducting devices connected to said sets of secondary windings and wherein the biassing means comprises auxiliary input windings on the two cores respectively energised by the two sets of pulses through said further unidirectionally conducting devices, the two windings associated with each core receiving pulses from different ones of the said two sets.

11. A relay according to claim 3, wherein the detector has four sets of secondary windings operative to develop four sets of said pulses, and comprising unidirectionally conducting devices connected to said sets of secondary windings, the magnetic circuit comprising two cores each having two input windings, all four windings in said magnetic circuit being respectively connected through said unidirectionally conducting devices to receive pulses from the said four sets, and each core being magnetised by the pulses applied to one of its input windings and reset by said predetermined amount by the pulses applied to its other input windings, whereby the cores are incrementally driven into saturation to develop an output in response to the pulses applied to said one input windings having a duration corresponding to a phase displacement not less than that defined by either one of said limits.

12. A relay according to claim 2, wherein the detector comprises a diode-resistor network for detecting coincidence of the input signals.

13. A relay according to claim 2, wherein the detector comprises a rectifier bridge phase comparator for developing unidirectional pulses for positive periods of coincidence and for negative periods of coincidence, and connector means for applying one set of the pulses to magnetise the core and the other set to reset the core by said predetermined amount, the core being driven towards saturation to develop said output only when the duration of the pulses in the said one set exceeds the duration of the pulses in the other.

References Cited

UNITED STATES PATENTS 3,441,745 4/1969 Reeves et al. ______ 340—170 X

HAROLD I. PITTS, Primary Examiner

U.S. Cl. X.R.

340—167, 149, 168, 147, 172